Feb. 10, 1931.   E. S. VAN VALKENBURG   1,791,985
BICYCLE FRAME
Filed Feb. 8, 1929
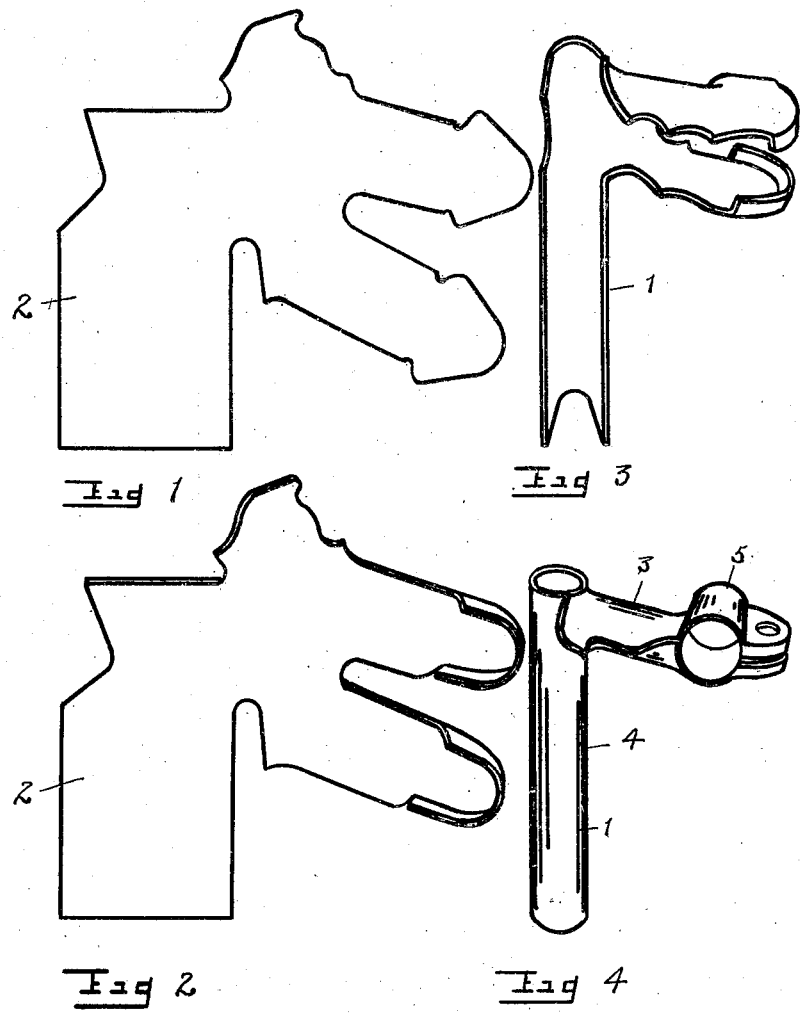
INVENTOR.
Edward S. Van Valkenburg
BY Thomas L. Wilder
ATTORNEYS.

Patented Feb. 10, 1931

1,791,985

UNITED STATES PATENT OFFICE

EDWARD S. VAN VALKENBURG, OF LITTLE FALLS, NEW YORK, ASSIGNOR TO HOMER P. SNYDER MANUFACTURING COMPANY, INC., OF LITTLE FALLS, NEW YORK, A CORPORATION OF NEW YORK

BICYCLE FRAME

Application filed February 8, 1929. Serial No. 338,513.

My invention relates to a bicycle frame, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a handle bar post made from sheet metal stamped to pattern, whereby to effect great strength with lightness of material.

The object will be understood by referring to the drawings in which:

Fig. 1 is a plan view showing a pattern of a handle bar stem employed.

Fig. 2 is a perspective view showing the pattern of Fig. 1 in the second stage of completion.

Fig. 3 is a perspective view showing the pattern of Fig. 1 in the third stage of completion.

Fig. 4 is a perspective view showing the handle bar stem made from pattern shown in Fig. 1 in final stage of completion.

Referring more particularly to the drawings, the handle bar post 1 is made by stamping the pattern thereof out of sheet metal 2 as shown in Fig. 1. The successive stages are shown in Figs. 2, 3, 4. The ends are brought together finally and welded, thereby forming a single piece post 1 that is hollow for lightness and, yet, possesses sufficient strength to serve its purpose. Part 3 forms a hollow tube nearly at right angles to hollow tube 4 and has a clamping part 5 adapted to hold adjustable handle bars therein.

Having thus described my invention what I claim as new and desire to secure by Letters Patent is as follows:

1. In a bicycle frame, a process of forming a handlebar post by bending sheet metal into a hollow tube, forming a clamping member at an angle to said post and securing the abutting edges.

2. In a bicycle frame, a process of forming a handlebar post by bending sheet metal into a hollow tube, forming a clamping member at an angle to said post and welding the abutting edges.

In testimony whereof I have affixed my signature.

EDWARD S. VAN VALKENBURG.